United States Patent
Keen et al.

(10) Patent No.: US 6,564,277 B1
(45) Date of Patent: May 13, 2003

(54) METHOD AND SYSTEM FOR HANDLING INTERRUPTS IN A NODE CONTROLLER WITHOUT ATTACHED PROCESSORS

(75) Inventors: John S. Keen, Mountain View, CA (US); Jeffrey G. Libby, Cupertino, CA (US); Swaminathan Venkataraman, San Jose, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/409,766

(22) Filed: Sep. 30, 1999

(51) Int. Cl.[7] ................................. G06F 1/00
(52) U.S. Cl. ................ 710/268; 710/260; 710/317
(58) Field of Search .................. 710/262, 268, 710/269, 267, 261, 317, 306, 309, 311; 709/201, 249

(56) References Cited

U.S. PATENT DOCUMENTS

| | | | | |
|---|---|---|---|---|
| 5,842,026 A | * | 11/1998 | Wong-Chan et al. ....... | 710/260 |
| 5,854,908 A | * | 12/1998 | Ogilvie et al. ............... | 710/306 |
| 6,105,102 A | * | 8/2000 | Williams et al. ............. | 710/261 |
| 6,148,361 A | * | 11/2000 | Carpenter et al. .......... | 710/260 |
| 6,170,025 B1 | * | 1/2001 | Drottar et al. ................ | 710/48 |
| 6,247,091 B1 | * | 6/2001 | Lovett .......................... | 710/260 |
| 6,295,573 B1 | * | 9/2001 | Bailey et al. ................ | 710/260 |

* cited by examiner

Primary Examiner—Mark H. Rinehart
Assistant Examiner—Raymond N Phan
(74) Attorney, Agent, or Firm—Baker Botts L.L.P.

(57) ABSTRACT

A node controller (12) includes a processor interface unit (24) that receives an interrupt signal (50). The processor interface unit (24) includes a register (52) with a forward enable bit (54). In response to the forward enable bit (54) being set, the processor interface unit (24) generates a forward interrupt signal (56) for transfer to an input/output interface unit (26) of the node controller (12). The input/output interface unit (26) generates an interrupt request for transfer to a remote node controller. The input/output interface unit (26) includes an interrupt destination register (58) that includes an identity of a particular remote node controller and associated processor interface unit to which the interrupt request is to be transferred. The remote node controller having a processor attached thereto to handle the interrupt request.

2 Claims, 2 Drawing Sheets

METHOD AND SYSTEM FOR HANDLING INTERRUPTS IN A NODE CONTROLLER WITHOUT ATTACHED PROCESSORS

TECHNICAL FIELD OF THE INVENTION

The present invention relates in general to computer system operation and more particularly to a method and apparatus for handling interrupts at a memory node controller without attached processors in a computer system.

BACKGROUND OF THE INVENTION

In a conventional multi-processor computer system, multiple node controllers are connected by an interconnection network and communicate among each other, over such network. Each node controller manages memory in a region of the computer system's address space, interfaces with attached processors, provides a port to communicate with attached input/output devices, and includes a network interface to provide communications with the interconnection network. There may be computer system designs and applications that may require only modest amounts of computational power and thus some node controllers may not have processors attached to them. Node controllers without attached processors provide memory capacity and input/output bandwidth for processors located elsewhere in the computer system.

When a node controller detects an anomalous event or an error that requires handling, the normal course of action is to signal an interrupt condition to a processor attached to the node controller. The processor will then service the interrupt, handle the error situation, and restore the computer system to a normal state. However, an anomalous event may occur at a node controller that does not have an attached processor. Therefore, it is desirable to provide a technique to handle an interrupt condition at a node controller that is not coupled to a processor.

SUMMARY OF THE INVENTION

From the foregoing, it may be appreciated that a need has arisen for a technique to handle interrupts at a node controller without an attached processor. In accordance with the present invention, a method and apparatus for handling interrupts at a memory node controller without attached processors in a computer system are provided that substantially eliminate or reduce disadvantages and problems associated with conventional computer systems.

According to an embodiment of the present invention there is provided a memory node controller without attached processors for handling interrupts that includes a processor interface unit that receives an interrupt signal associated with an interrupt condition. The processor interface unit determines whether the interrupt signal is to be forwarded. The processor interface unit forwards the interrupt signal in response to a determination that the interrupt signal is to be forwarded. An input/output interface unit receives the interrupt signal from the processor interface unit. The input/output interface unit generates an interrupt request in response to the interrupt signal for transfer to a remote node controller. The remote node controller includes a processor that can process the interrupt condition.

The present invention provides various technical advantages over conventional computer system operation. For example, one technical advantage is to provide an ability to handle errors that occur in a node controller without an attached processor. Another technical advantage is to forward an interrupt condition from a node controller without an attached processor to a remote node controller that has a processor capable of handling the interrupt condition. Yet another technical advantage is to identify a remote node controller that can handle the interrupt condition. Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
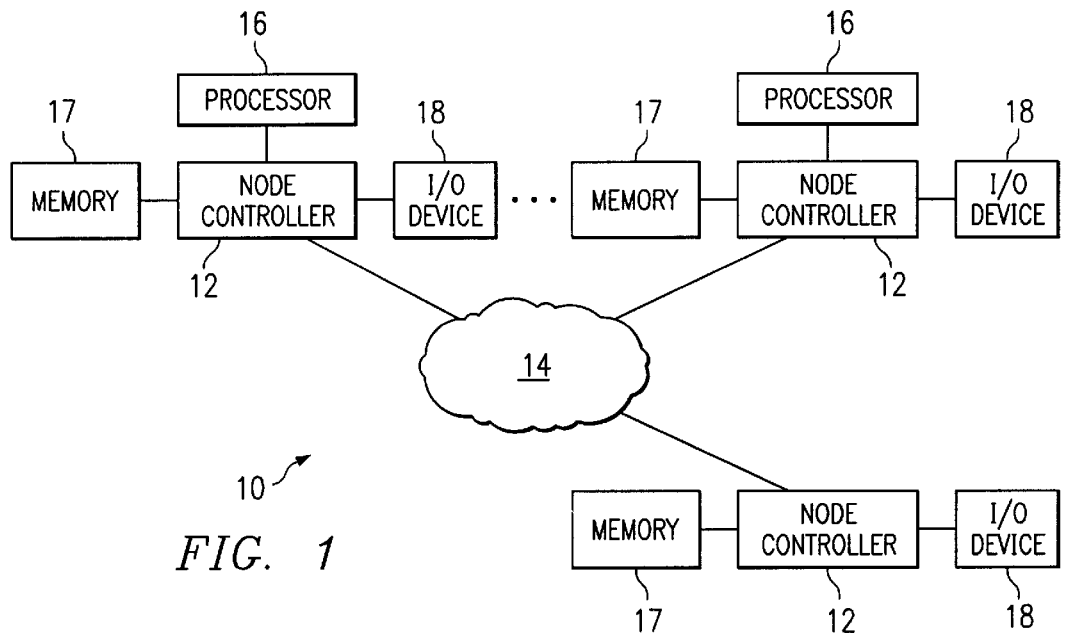
FIG. 1 illustrates a block diagram of a computer system.

FIG. 1 is a block diagram of a computer system 10. Computer system 10 includes a plurality of node controllers 12 interconnected by a network 14. Each node controller 12 processes data and traffic both internally and with other node controllers 12 within computer system 10 over network 14. Each node controller 12 may communicate with a local processor 16, a local memory device 17, and a local input/output device 18. Computer system 10 may include node controllers 12 without attached processors for configurations that do not require additional processing power but do provide the memory capacity and input/output port capability for certain applications to be executed in computer system 10.

Figure 2:
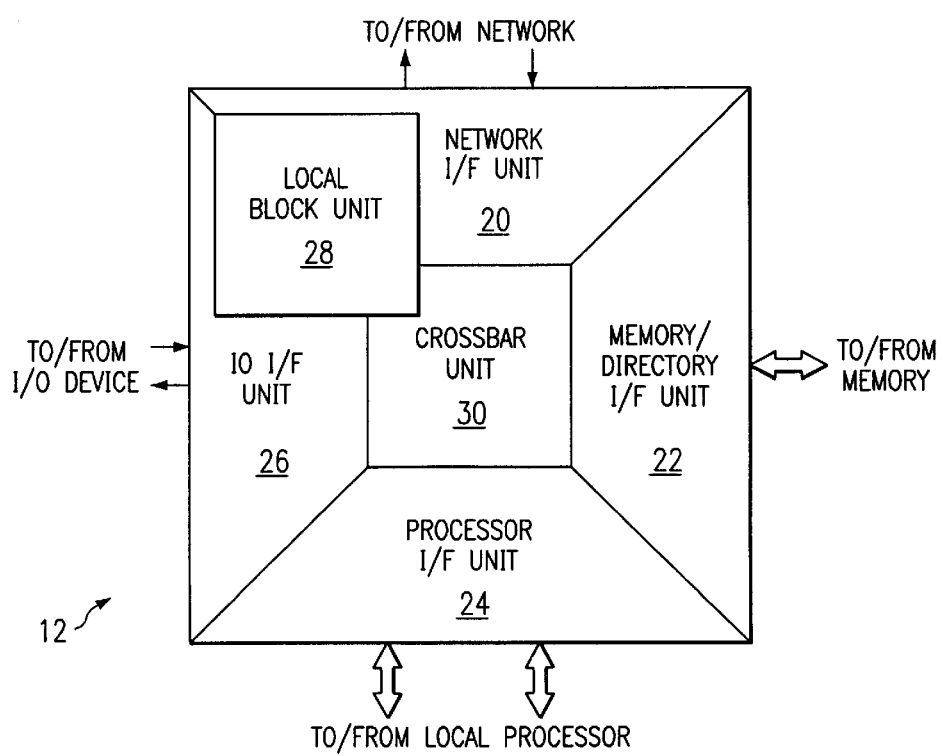
FIG. 2 illustrates a block diagram of a node controller in the computer system.

FIG. 2 is a block diagram of node controller 12 used in a multi-processor computer system 10. Node controller 12 includes a network interface unit 20, a memory directory interface unit 22, a processor interface unit 24, an input/output interface unit 26, a local block unit 28, and a crossbar unit 30. Network interface unit 20 may provide a communication link to network 14 in order to transfer data, messages, and other traffic to other node controllers 12 in computer system 10. Processor interface unit 22 may provide a communication link with one or more local processors 16. Memory directory interface unit 22 may provide a communication link with one or more local memory devices 17. Input/output interface unit 26 may provide a communication link with one or more local input/output devices 18. Local block unit 28 is dedicated to processing invalidation requests and programmed input/output operations. Crossbar unit 30 arbitrates the transfer of data, messages, and other traffic for node controller 12.

Figure 3:
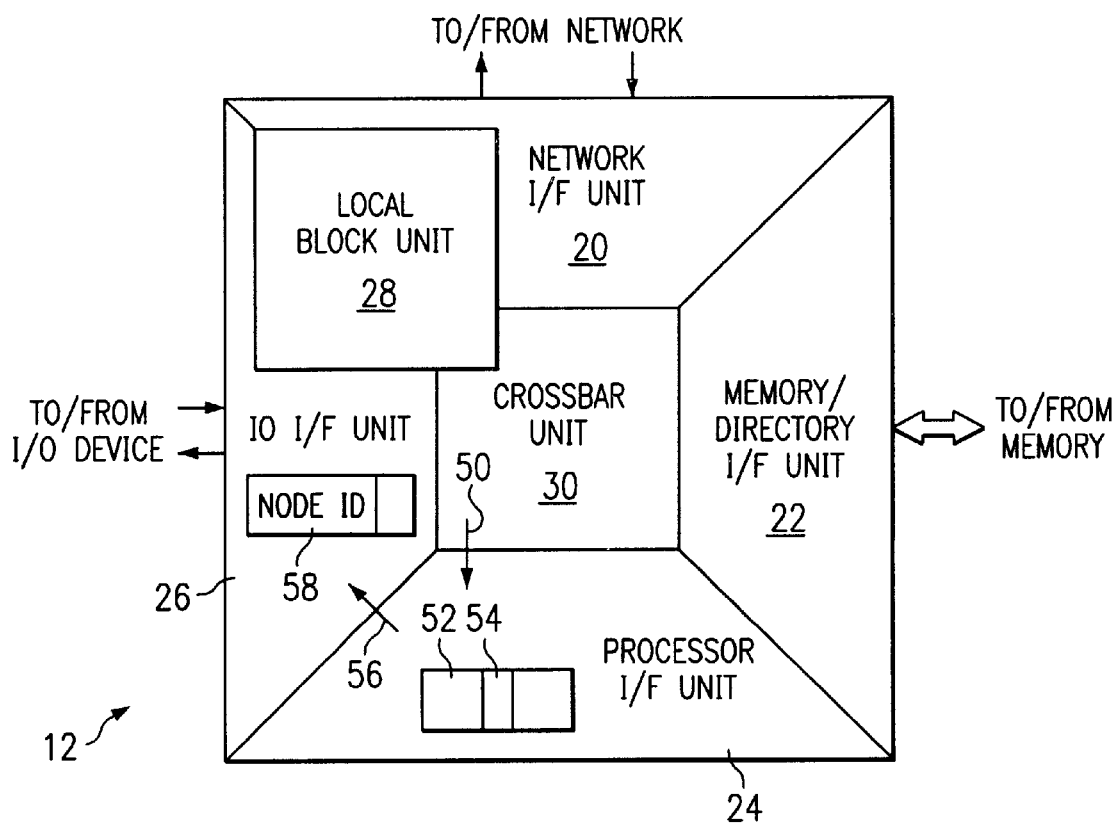
FIG. 3 illustrates handling of interrupts in the node controller.

FIG. 3 shows how node controller 12 without an attached processor 16 handles interrupts. When node controller 12 detects an error or any other reason for causing an interrupt, an interrupt signal 50 is received at processor interface unit 24. Processor interface unit 24 includes a register 52 that includes a forward enable bit 54. Forward enable bit 54, when set, indicates that interrupt requests are to be forwarded to a remote node controller for processing. Though forward enable bit 54 may be set at any time and under any circumstances or configurations, forward enable bit 54 is most likely to be set when there are no processors 16 attached to node controller 12. When processor interface unit 24 receives an interrupt signal when forward enable bit 54 is set, a forward interrupt signal 56 is generated therefrom and provided to input/output interface unit 26. Forward interrupt signal 56 includes information pertaining to the interrupt condition that initiated interrupt signal 50 to processor interface unit 24. Preferably, forward interrupt signal 56 is provided to input/output interface unit 26 through a simple interface without passing through crossbar unit 30.

Upon receiving forward interrupt signal 56 from processor interface unit 24, input/output interface unit 26 generates an interrupt request for transfer to a remote node controller. Input/output interface unit 26 includes an interrupt destination register 58. Interrupt destination register 58 includes programmable fields that determine a particular remote node controller and processor interface unit to which the generated interrupt request is to be transferred. Presumably, the interrupt request is transferred to a remote node controller that has an attached processor capable of processing the interrupt request. However, the interrupt request may be transferred to a remote node controller for subsequent transfer to another remote node controller.

Upon transferring the interrupt request, the interrupt condition is cleared from processor interface unit 24 in response to the processing of the interrupt request by a processor at the remote node controller. Upon clearing the interrupt condition from processor interface unit 24, the interrupt condition is cleared from input/output interface unit 26. If an interrupt condition persists in processor interface unit 24 at the time the interrupt condition is cleared from input/output interface unit 26, another forward interrupt signal may be sent to input/output interface unit 26.

Thus, it is apparent that there has been provided, in accordance with the present invention, a method and apparatus for handling interrupts in a node controller of a computer system that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A node controller without attached processors for handling interrupts, comprising:

a processor interface unit operable to receive an interrupt signal associated with an interrupt condition, the processor interface unit operable to determine whether the interrupt signal is to be forwarded, the processor interface unit operable to forward the interrupt signal in response to a determination that the interrupt signal is to be forwarded;

an input/output interface unit operable to receive the interrupt signal from the processor interface unit, the input/output interface unit operable to generate an interrupt request in response to the interrupt signal for transfer to a remote node controller;

a network interface unit operable to transfer the interrupt request to the remote node controller;

a crossbar unit coupled to the network interface unit, the processor interface unit, and the input/output interface unit, the crossbar unit operable to transfer information among each of these interface units, wherein the interrupt signal is directly forwarded to the input/output interface unit from the processor interface unit without being transferred by the crossbar unit.

2. A node controller without attached processors for handling interrupts, comprising:

a processor interface unit operable to receive an interrupt signal associated with an interrupt condition, the processor interface unit operable to determine whether the interrupt signal is to be forwarded, the processor interface unit operable to forward the interrupt signal in response to a determination that the interrupt signal is to be forwarded;

an input/output interface unit operable to receive the interrupt signal from the processor interface unit, the input/output interface unit operable to identify a remote node controller regardless of whether the remote node controller has at least one processor attached thereto, the input/output interface operable to generate an interrupt request in response to the interrupt signal for transfer to a remote node controller, wherein the processor interface unit is one of a plurality of processor interface units, each of the plurality of processor interface units operable to receive and forward the interrupt signal.

* * * * *